United States Patent
Brooks

(10) Patent No.: US 6,532,511 B1
(45) Date of Patent: Mar. 11, 2003

(54) ASOCHRONOUS CENTRALIZED MULTI-CHANNEL DMA CONTROLLER

(75) Inventor: John Milford Brooks, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,820

(22) Filed: Sep. 30, 1999

(51) Int. Cl.⁷ .............................................. G06F 12/00
(52) U.S. Cl. ............................ 710/305; 710/8; 710/22; 710/104; 710/312
(58) Field of Search ................................. 710/8, 22, 27, 710/28, 62, 65, 104, 305, 306, 308, 312, 313

(56) References Cited

U.S. PATENT DOCUMENTS

| | | | |
|---|---|---|---|
| 5,208,915 A | * | 5/1993 | Stadlmeir et al. |
| 5,623,697 A | | 4/1997 | Bland et al. ................. 395/842 |
| 5,717,873 A | | 2/1998 | Rabe et al. .................. 395/290 |
| 5,768,545 A | | 6/1998 | Solomon et al. ............. 395/306 |
| 5,774,681 A | | 6/1998 | Kunishige .................... 395/308 |
| 6,145,017 A | * | 11/2000 | Ghaffari ......................... 710/5 |
| 6,279,050 B1 | * | 8/2001 | Chilton et al. ................. 710/20 |

* cited by examiner

Primary Examiner—Matthew Kim
Assistant Examiner—C. P. Chace
(74) Attorney, Agent, or Firm—Foley & Lardner

(57) ABSTRACT

An electronic bridging device for transferring electronic data between a first device attached to a system bus and a peripheral device attached to a peripheral bus using a bridging circuit. The DMA controller comprises a system bus interface circuit for connecting the DMA controller to the system bus, a peripheral bus interface circuit for connecting the DMA controller to the peripheral bus, a data transfer request circuit for receiving data transfer requests from devices attached to the peripheral bus, and a control logic circuit for controlling the operation of DMA data transfer operations. Immediately upon receipt of one or more data transfer requests, the bridging device performs the following operations: requests access to the system bus, concatenates all pending peripheral bus data words into a single transfer, and transfers all pending requests across the bridging circuit. A corresponding method of transferring electronic data between a first device attached to a system bus and a peripheral device attached to a peripheral bus using a bridging circuit having a DMA controller is disclosed. The method comprises receiving one or more data transfer requests from devices attached to the system bus and the peripheral bus, immediately requesting access to the system bus upon receipt of the data transfer requests by the DMA controller, concatenating all pending peripheral bus data words into a single transfer sequence, and transferring all pending requests across the bridging circuit.

16 Claims, 4 Drawing Sheets

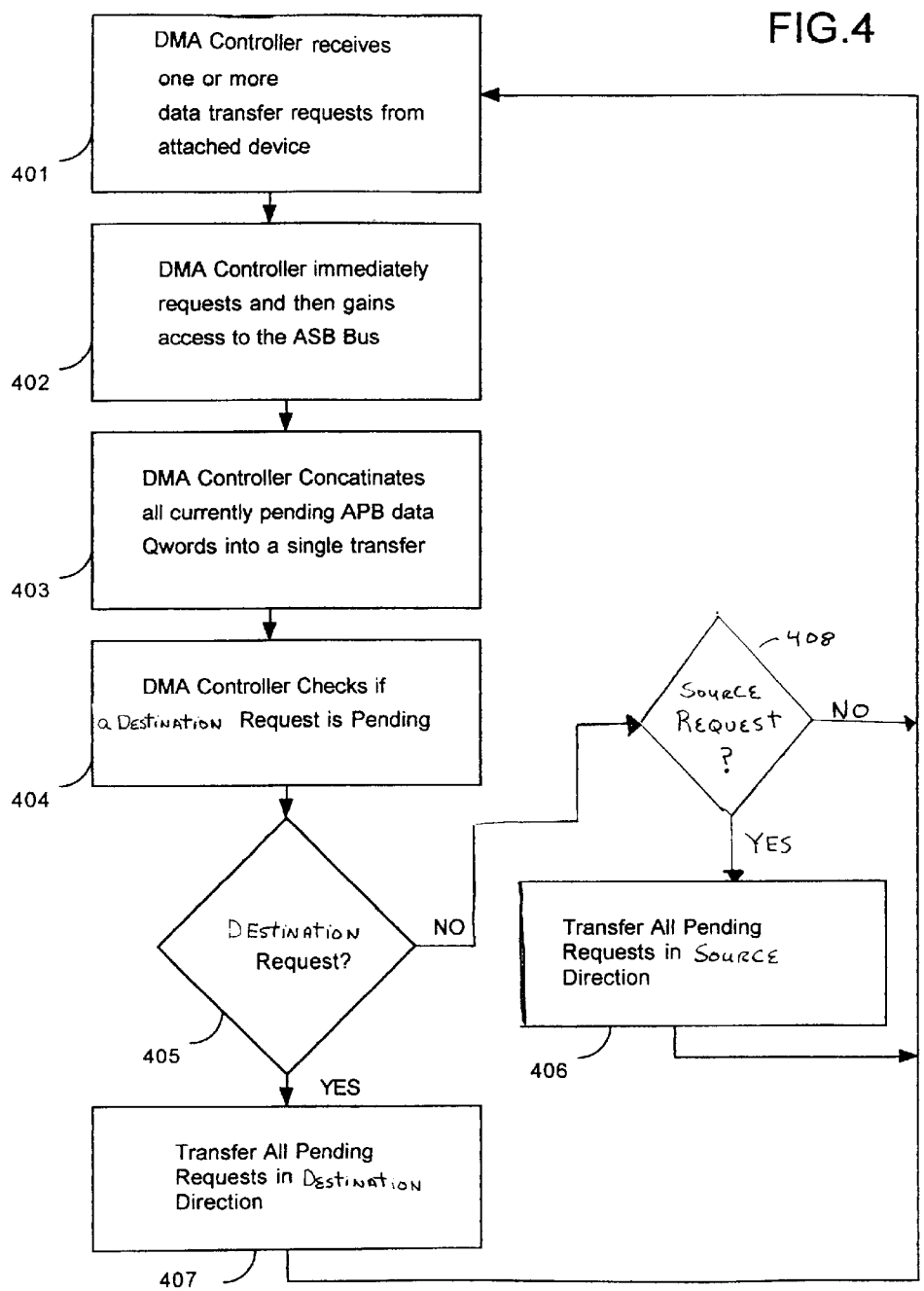

ASOCHRONOUS CENTRALIZED MULTI-CHANNEL DMA CONTROLLER

TECHNICAL FIELD

This invention relates in general to a method and apparatus for providing an asochronous centralized multi-channel DMA controller, and more particularly to a method and apparatus for providing a multi-channel DMA controller that provides low data latency, minimal data buffering, guaranteed data bandwidth, and asynchronous demand support within a bus bridging device within an AHB or ASB to APB bus system as defined by the AMBA bus definition.

BACKGROUND OF THE INVENTION

The Advanced Microcontroller Bus Architecture (AMBA) specification defines an on-chip communications standard for designing high-performance embedded microcontrollers. Three distinct buses are defined within the AMBA specification: an Advanced High-performance Bus (AHB), an Advanced System Bus (ASB), and an Advanced Peripheral Bus (APB). A typical implementation of an AMBA system is shown in FIG. 1.

The AMBA AHB is for high-performance, high clock frequency system modules. The AHB acts as the high-performance system backbone bus. AHB supports the efficient connection of processors, on-chip memories and off-chip external memory interfaces with low-power peripheral macrocell functions. AHB is also specified to ensure ease of use in an efficient design flow using synthesis and automated test techniques.

The AMBA ASB is for high-performance system modules. AMBA ASB is an alternative system bus suitable for use where the high-performance features of AHB are not required. ASB also supports the efficient connection of processors, on-chip memories and off-chip external memory interfaces with low-power peripheral macrocell functions.

The AMBA APB is for low-power peripherals. AMBA APB is optimized for minimal power consumption and reduced interface complexity to support peripheral functions. APB can be used in conjunction with either version of the system bus.

An AMBA-based microcontroller typically consists of a high-performance system backbone bus (AMBA AHB or AMBA ASB), able to sustain the external memory bandwidth, on which the CPU, on-chip memory and other Direct Memory Access (DMA) devices reside. This bus provides a high-bandwidth interface between the elements that are involved in the majority of transfers. Also located on the high-performance bus is a bridge to the lower bandwidth APB, where most of the peripheral devices in the system are located.

The APB provides the basic peripheral macrocell communications infrastructure as a secondary bus from the higher bandwidth pipelined main system bus. Such peripherals typically have interfaces that are memory-mapped registers, have no high-bandwidth interfaces, and are accessed under programmed control. The external memory interface is application-specific and may only have a narrow data path, but may also support a test access mode which allows the internal AMBA AHB, ASB and APB modules to be tested in isolation with system-independent test sets.

AHB is a later generation of AMBA bus that is intended to address the requirements of high-performance synthesizable designs. It is a high-performance system bus that supports multiple bus masters and provides high-bandwidth operation. The AHB implements the features required for high-performance, high clock frequency systems including burst transfers, split transactions, single-cycle bus master handover, single-clock edge operation, non-tristate implementation, and wider data bus configurations (64/128 bits). Bridging between this higher level of bus and the current ASB/APB can be done efficiently to ensure that any existing designs can be easily integrated.

An AHB design may contain one or more bus masters, typically a system would contain at least the processor and test interface. However, it would also be common for a Direct Memory Access (DMA) or Digital Signal Processor (DSP) to be included as bus masters. The external memory interface, APB bridge and any internal memory are the most common AHB slaves. Any other peripheral in the system could also be included as an AHB slave. However, low-bandwidth peripherals typically reside on the APB.

A typical AHB system design contains the following components: an AHB master, an AHB slave, an AHB arbiter, and an AHB decoder. A bus master is able to initiate read and write operations by providing an address and control information. Only one bus master is allowed to actively use the bus at any one time. A bus slave responds to a read or write operation within a given address-space range. The bus slave signals back to the active master the success, failure or waiting of the data transfer. The bus arbiter ensures that only one bus master at a time is allowed to initiate data transfers. Even though the arbitration protocol is fixed, any arbitration algorithm, such as highest priority or fair access can be implemented depending on the application requirements. An AHB would include only one arbiter, although this would be trivial in single bus master systems. The AHB decoder is used to decode the address of each transfer and provide a select signal for the slave that is involved in the transfer. A single centralized decoder is required in all AHB implementations.

In one particular application that utilizes the AMBA bus architecture, an implementation of a Cable Modem design, an embedded processor with memory and several peripheral functions with physical interfaces to external media sources has been implemented using the AMBA bus architecture. These external data links, such as Ethernet, USB, and Cable need access to the memory with bandwidths of –100 Mb/s for Ethernet transmit and Ethernet receive, 12 Mb/s for USB receive or transmit, and 40–50 Mb/s for Cable receive and 10 Mb/s for Cable transmit. These data sources must have guaranteed access to the memory for buffering prior to processing otherwise data will be lost. In addition to these external sources of data, internal functions such as memory to memory move, and DES (Decryption and Encryption Subsystem) engine processing need direct access to memory in order to off-load the processor of these tasks. A method is needed such that each peripheral had direct memory access in such a way that data bandwidth would be sufficient and data would not be lost. Of course minimizing the system design complexity and cost was a factor that affected the solution as well.

In prior attempts to address this problem, each peripheral, which may be a physical interface with data source/sink, may have been connected to a standard PCI bus. Each peripheral would need to have a DMA controller that would master the bus to write/read data to/from target memory The more the data peripherals the more complex it becomes to efficiently manage the bandwidth allocation from each asynchronous bus requestor. Essentially the system arbiter would have to prioritize requests and decide who gets the bus first.

The latency each peripheral sees would be subject to how efficiently each higher priority peripheral used the bus and the bandwidth of that peripheral. The higher the latency, the more local buffering each peripheral would need in order to avoid overflow or underflow of data.

Other prior solutions to the asynchronous demand mode, which creates havoc in arbitrated systems, include a 1394 bus, which allocates isochronous channels. Each data peripheral would be guaranteed bandwidth by assigning a time slot allocated for the data. The problem in a time slice system, such as a 1394 bus, would be that the resolution of the time slots would again force a high amount of local buffering because each peripheral would not be able to make asynchronous requests which would allow them to off-load the data before it accumulates. The other problem with this system design solution is that it does not mix well with variable-rate data channels. The 1394 bus does support asynchronous channels as well as isochronous channels, but again the system complexity is higher, especially when the bandwidths of all data channels need adjustment dynamically.

SUMMARY OF THE INVENTION

To overcome the limitations in the prior art described above, and to overcome other limitations that will become apparent upon reading and understanding the present specification, the present invention discloses a method and apparatus for providing a multi-channel DMA controller that provides low data latency, minimal data buffering, guaranteed data bandwidth, and asynchronous demand support within a bus bridging device within an AHB to APB bus system as defined by the AMBA bus definition. The present invention solves the above described problems by providing an electronic bridging device for transferring electronic data between a first device attached to a system bus and a peripheral device attached to a peripheral bus using a bridging circuit. The DMA controller comprises a system bus interface circuit for connecting the DMA controller to the system bus, a peripheral bus interface circuit for connecting the DMA controller to the peripheral bus, a data transfer request circuit for receiving data transfer requests from devices attached to the peripheral bus, and a control logic circuit for controlling the operation of DMA data transfer operations. Immediately upon receipt of one or more data transfer requests, the bridging device performs the following operations: requests access to the system bus, concatenates all pending peripheral bus data words into a single transfer sequence, and transfers all pending requests across the bridging circuit.

Another aspect of the present invention is a method of transferring electronic data between a first device attached to a system bus and a peripheral device attached to a peripheral bus using a bridging circuit having a DMA controller. The method comprises receiving one or more data transfer requests from devices attached to the system bus and the peripheral bus, immediately requesting access to the system bus upon receipt of the data transfer requests by the DMA controller, concatenating all pending peripheral bus data words into a single transfer sequence, and transferring all pending requests across the bridging circuit.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates a logical operational flow diagram of the operation of the DMA controller according to an embodiment of the present invention.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention provides a multi-channel DMA controller that provides low data latency, minimal data buffering, guaranteed data bandwidth, and asynchronous demand support within a bus bridging device within an AHB to APB bus system as defined by the AMBA bus definition.

A DMA Controller according to one embodiment of the present invention solves the problems of high design complexity and cost, low latency and minimal buffering, guaranteed bandwidth, and asynchronous demand support. The DMA functionality for each data peripheral is centralized into a common design, which provides all of the addressing intelligence and dataflow control for access to/from memory.

Figure 1:
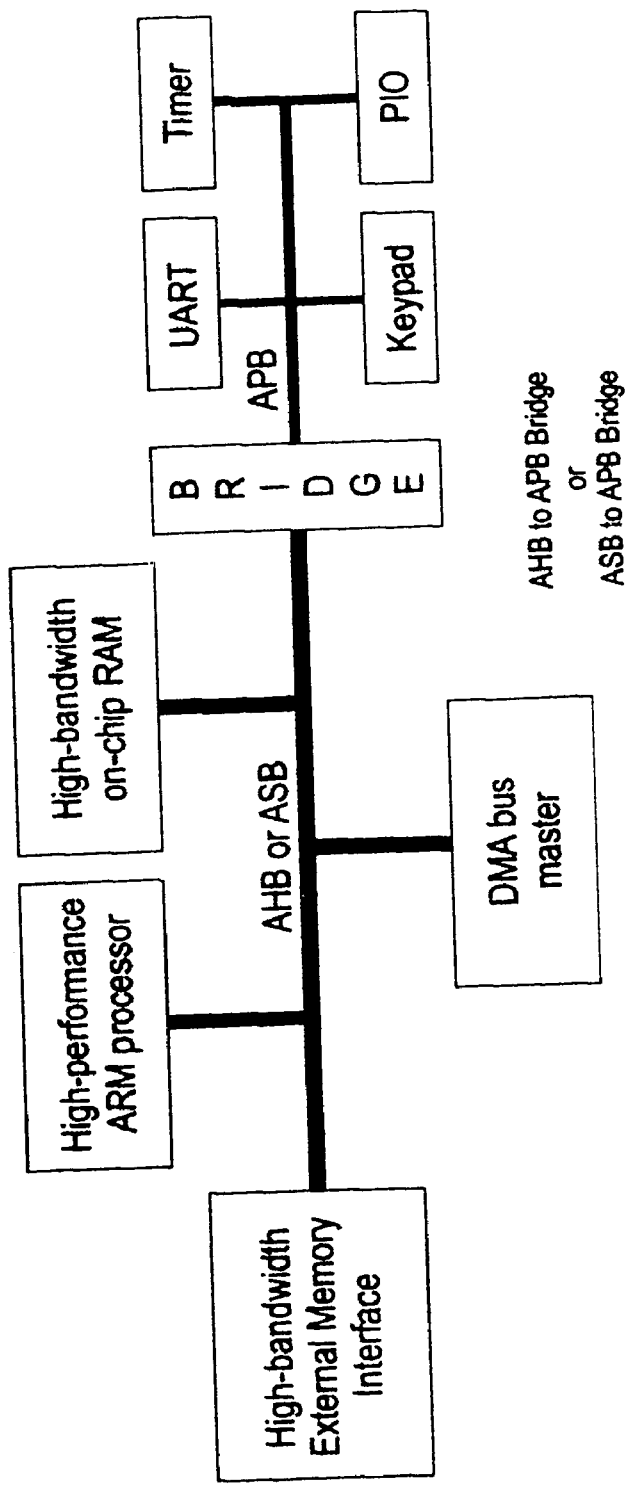
FIG. 1 illustrates a logical block diagram for a typical AMBA architecture including an ASB bus and an APB bus connected using a bridge.
Figure 2:
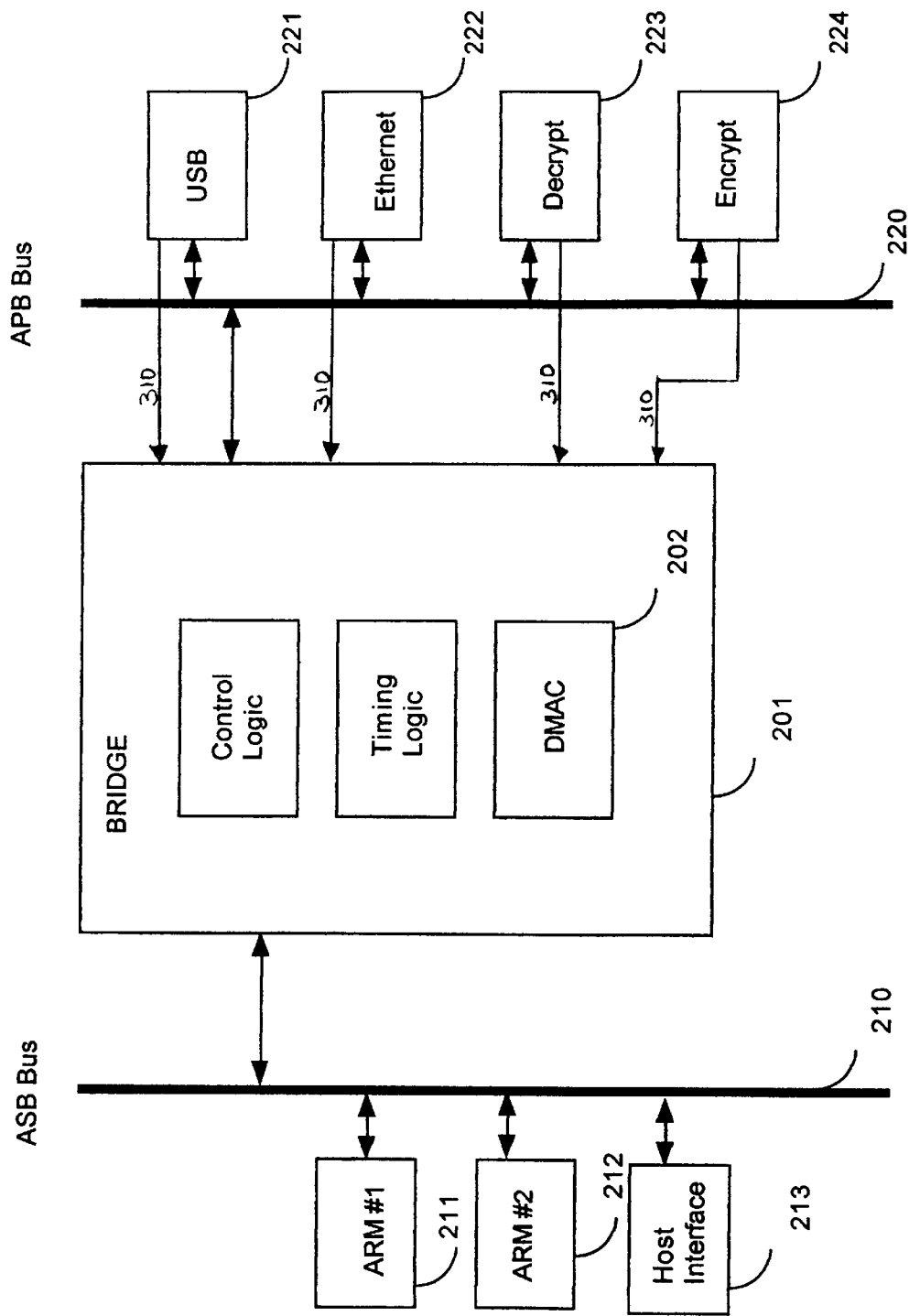
FIG. 2 illustrates a logical block diagram of a system including an ASB bus and an APB bus connected using a bridge according to an example embodiment of the present invention.

As shown in FIG. 2, the DMA Controller 202 resides in an ASB/APB bridge 201 which connects the fact processor/memory bus (ASB) 210 to the slower peripheral Bus (APB) 220. The DMA Controller 202 is a master of either bus, whereby both masters may be operating concurrently. The maximum throughput on either side of the bridge is the same so that the DMA Controller 202 does not have to provide any local buffering other than pipelining transactions to deal with the arbitration latency of the multi-master high-speed ASB side 210.

Devices attached to the ASB bus 210 may include a first ARM processor 211, a second ARM processor 212, and a host interface 213. Often high-data transfer devices may be attached to the ASB bus 210. Peripheral devices attached to a slower APB bus 220 may include an USB device module 221, an ethernet module 222, a data encryption module 223, and data decryption module 224.

Figure 3:
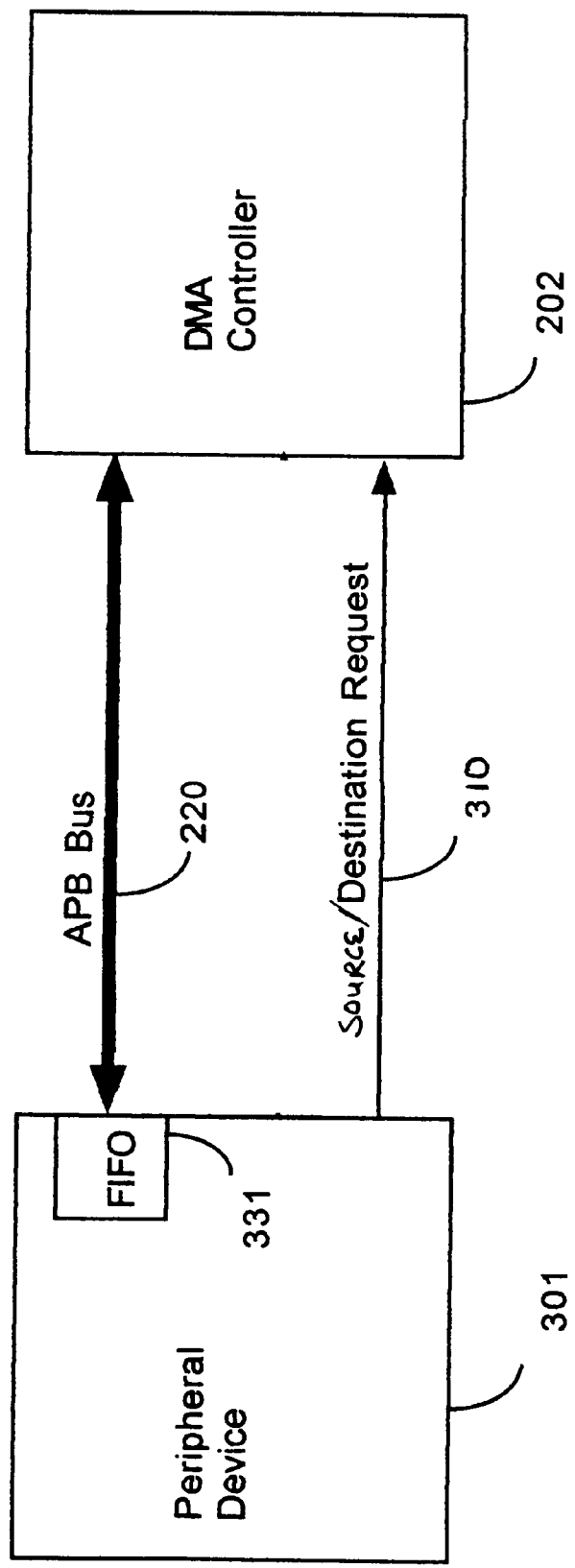
FIG. 3 illustrates a logical block diagram of a bridge/DMA controller to peripheral device connected using an APB bus according to an example embodiment of the present invention.

As shown in FIG. 3, each data peripheral provides a 3-bit coded request signal to the DMA Controller to either request data from memory—a source request 310 which provides data read from memory to the peripheral 301, or request that data be sent to memory—a destination request 310 where data is read from the peripheral and written to memory. All data transactions from the peripherals 301 occur as qword (64-bit) transfers, which only consume one cycle on our 64-bit APB (Advanced Peripheral Bus) 220. This word size was chosen to maximize bus efficiency while also minimizing local peripheral data buffering requirements. Each data peripheral 301 would then have a FIFO 331 of qwords where its depth would depend on its throughput requirements as well as the overall maximum system latency.

Having all bus transactions quantized to qwords also simplifies the control by removing variability due to dynamic sizing of data transfers. Alternate embodiments of this DMA Controller 202 could offer byte resolution transfers by encoding the number of bytes in the DMA request signal 310. Each data peripheral 301 is in charge of providing or receiving data and keeping track of the amount of data transferred. The peripheral has no idea where the data is going or coming from though since the DMA Controller 202 is in charge of all addressing as well as addressing modes. The DMA Controller 202 supports contiguous or circular buffer streaming as well as dynamically linked list addressing modes. The data streaming, linking, and concatenation are all transparent to the data peripheral. Each data peripheral channel has some control over the addressing via the 3-bit request signal 310. There are codes for the following: idle, request qword data transfer, interrupt, save channel current pointer, reload current pointer from saved pointer, request qword data transfer from saved pointer, advance current pointer with no data transfer. This additional addressing control flexibility in the hands of the data channel peripheral 301 gives the peripheral the opportunity to abort packets and/or restart transmissions.

Guaranteeing the bandwidth required by 16 data/status channels and 4 address link channels is needed for the cable modem application. Having an arbiter decide which channels to deal with first fails to provide these services because the latency of the lowest bandwidth channels may increase to the point where even this channel requires substantial data buffering. The only way to meet these requirements at a minimum cost is to remove the requirement for channel arbitration. Essentially, when the DMA Controller 202 gets a data request from a peripheral 301, it 202 immediately requests access to the ASB 210, which is a multi-master bus (external Host interface 213, ARM9 #1 211, ARM9 #2 212 and DMAC 202). Once the DMAC 202 gets control of the bus 210, it concatenates all APB data qword (64-bit) transactions together that are pending at the time of an ASB grant. The DMAC 202 then performs all transfers in either source or destination directions. The transaction concatenation must occur, because if the DMAC 202 gave up the ASB bus 210 in between the transfer of every qword, the resulting data latency would be high, since an ARM processor 211 or 212 may gain bus access to perform a qdword (4 dwords) transfer in between any DMAC transfer. As a result, DMAC 202 would be left to arbitrate channel requests on a bandwidth prioritization basis. The DMAC 202 is given the highest bus priority by the ASB arbiter.

FIG. 4 illustrates a logical operational flow diagram for the operation of the DMAC 202. The process starts with operation 401 in which the DMAC 202 receives one or more data transfer requests 310 from attached devices. In operation 402, the DMAC 202 immediately requests and gains access to the ASB 210 bus. Once the DMAC 202 gains access to the ASB 210 bus, the DMAC 202 concatenates all currently pending APB bus 220 data qwords together into a single packet in operation 403. Next, the DMAC 202 checks if one or more of the pending data transfer requests are destination requests 310 in operation 404. In a branch operation, 405 the processing branches to operation 408 if no destination data transfer requests are pending. If destination transfer requests are pending the DMAC 202 makes all the requests in the Destination direction and then control returns to operation 401. In operation 408, the DMAC 202 checks if there are any source requests pending. If there are no source requests pending then control is transferred back to operation 401. If in Operation 408 the DMAC 202 finds a source request pending it transfers the pending data transfer requests in the source direction. Control then returns to operation 401.

If branch operation 405 found a destination request pending, the operations of the DMAC 202 branch to operation 407 in which the DMAC 202 transfers all pending data transfer requests in the destination direction. Once complete, the processing branch is back to operation 404 in which the next data transfer operation will occur. Note that this procedure gives priority to transfers in the destination direction, rather than in the source direction, and any pending source transfer requests will be processed in the subsequent transfer operation.

The above method does not result in the DMAC 202 stealing all the bandwidth from the ARMs processors 211 or 212. First, the DMAC 202 will only use the bandwidth required by the aggregate data channels in order to avoid loss of data. Whether the data gets to memory spread out or in a high priority fashion does not change the total throughput requirement.

Secondly, the ARM processors 211 or 212 can tolerate bus latency better than the data peripherals 301 and they are designed in such a way to minimize access to the system bus 210, given their local cache memory. Even though the ASB arbiter gives the DMAC 202 highest priority, it gives the first ARM-processor 211 parking rights since it will be the most often requestor for access to the ASB 210 bus and thus can benefit from one less arbitration cycle overhead.

Now that the DMAC 202 has all of the ASB bus 210 access it needs to maintain aggregate throughput, it 202 must however use the ASB bus 210 in an efficient manner since it cannot afford to waste bus cycles that could be used by other ASB devices. Since the DMAC 202 is concatenating qword transactions from all APB pending requests in order to minimize latency seen by each peripheral 301, it must do it real time in order to avoid buffering as well as reduce latency. This feature requires that the throughput on each side of the DMAC bridge 201 must be the same. This fact imposes a requirement that the APB bus, which is half the speed of the ASB bus, must possess twice the data bus width. All destination requests must be processed first before the source requests in order to maintain bus efficiency on the ASB 210. Destination transfers consist of reading the APB bus 220 followed by writing to the ASB bus 210 through the bridge device 201. In contrast, source transfers consist of reading the ASB bus 210 first followed by writing to the APB bus 220. Thus all data transfers are a sequence of read operations followed by write operations.

Because of the data transfer pipelining of transactions flowing through the DMAC 202, only a back-to-back ASB bus 210 write operation followed by a read operation could be efficient. An ASB bus 210 read operation followed by write would prove to be inefficient because the ASB bus 210 read operation would require an APB write operation to occur. As a result, the APB read operation would occur before executing the ASB write operation. Thus the ASB read operation and write operation would be separated in time by idle (wasted) cycles during the ASB bus 210 grant.

This system design does not allow asynchronous data processing peripherals 301 such as DES/CRC engine 223 or a memory-to-memory move operation hog the ASB bus 210 from the ARMs processors 211 or 212. This result could occur easily by processing a subsequent data request from the same data peripheral device 301 during a single ASB grant.

Theoretically, the DMAC 202 should not have to process concatenated transaction requests from the same data channel during a single ASB grant. Otherwise this result would suggest that the aggregate bandwidth of the data channels exceeds the available system bandwidth. Thus, the DMAC only concatenates transactions from all pending channels at the time of the ASB grant and excludes all channels re-queued until the next ASB grant. In summary, the maximum latency any data peripheral channel sees is only one ASB bus arbitration latency, which is at most a four-word cache-line fill by the ARM processor 211 from the external sdram, plus the time on the bus by the DMAC 202, which could be the concatenation of many channels.

The DMA Controller 202 according to the present invention offers may advantages over other traditional decentralized designs. First by centralizing the design, which is virtually impossible for a standard bus such as PCI in a non-embedded system, it simplifies the design and lowers the cost and complexity of each data peripheral 301. Only the one DMA Controller 202 has to deal with complex bus mastering of the bridged busses and memory access as well as the higher speed and signal content. The centralized design also offers the highest degree of addressing intelligence since any of its modes can be offered to any channel, vs. the myriad of methods that would be the outcome when the design would be left to multiple designers.

Secondly this DMA Controller 202 according to the present invention offers the lowest possible latency to each data peripheral while maintaining guaranteed bandwidth upon asynchronous demand. The latency seen by each data peripheral was reduced to the point where no memory-based buffers were required. All local buffering could be done efficiently and more easily with a stdcell-based set of registers. This cost was minimized as well as design/layout complexity. This DMA controller 202 defines the new term "asochronous channel operation" because it offers the support for asynchronous variable-rate data demands as well as guaranteeing the bandwidth of high-throughput isochronous data channels.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of transferring electronic data between a first device attached to a system bus and a peripheral device attached to a peripheral bus using a bridging circuit having a DMA controller, the method comprising:

receiving one or more data transfer requests from said peripheral device attached to the peripheral bus;

requesting access to the system bus upon receipt of the one or more data transfer requests by the DMA controller;

concatenating data words from all pending data transfer requests from said peripheral device into a single transfer sequence; and transferring the single transfer sequence across the bridging circuit.

2. The method according to claim 1, wherein the method further comprises:

determining if one or more of the pending data transfer requests comprise data transfer requests to read data from the first device and deliver the data to the peripheral device;

transferring, if one or more of the pending data transfer requests comprise data transfer requests to read data from the first device and deliver the data to the peripheral device, the single transfer sequence prior to transferring the data read from the first device; and transferring the data read from the first device.

3. The method according to claim 2, wherein the system bus operates at twice an operating frequency of the peripheral bus.

4. The method according to claim 3, wherein the a data width of the peripheral bus is twice the data width of the system bus.

5. The method according to claim 2, wherein the system bus comprises an ASB bus according to an AMBA architecture.

6. The method according to claim 2, wherein the peripheral bus comprises an APB bus according to an AMBA architecture.

7. The method according to claim 2, wherein one or more of the data transfer requests comprises a three-bit source data transfer request.

8. The method according to claim 7, wherein one or more of the data transfer requests comprises a three-bit destination data transfer request.

9. An electronic bridging device for transferring electronic data between a first device attached to a system bus and a peripheral device attached to a peripheral bus using a bridging circuit containing a DMA controller, the DMA controller comprising:

a system bus interface circuit for connecting the DMA controller to the system bus;

a peripheral bus interface circuit for connecting the DMA controller to the peripheral bus;

a data transfer request circuit for receiving data transfer requests from devices attached to the peripheral bus; and a control logic circuit for controlling the operation of DMA data transfer operations;

wherein:

upon receipt of one or more data transfer requests, the bridging device performs the following operations:

requests access to the system bus;

concatenates data words from all pending data transfer requests from said devices attached to said peripheral bus into a single transfer sequence; and transfers the single transfer sequence across the bridging circuit.

10. The electronic bridging device according to claim 9, wherein upon receipt of one or more data transfer requests, the bridging device further performs the following operations:

determining if one or more pending data transfer requests comprise data transfer requests to read data from the first device and deliver said data to the peripheral device;

transferring, if one or more of said pending data transfer requests comprise data transfer requests to read data from the first device and deliver said data to the peripheral device, the single transfer sequence prior to transferring the data read from the first device; and transferring the data read from the first device to the peripheral device.

11. The electronic bridging device according to claim 10, wherein the system bus operates at twice an operating frequency of the peripheral bus.

12. The electronic bridging device according to claim 11, wherein the peripheral bus is twice the width of the system bus.

13. The electronic bridging device according to claim 10, wherein the system bus comprises an ASB bus according to an AMBA architecture.

14. The electronic bridging device according to claim 10, wherein the peripheral bus comprises an APB bus according to an AMBA architecture.

15. The electronic bridging device according to claim 10, wherein one or more of the data transfer requests comprises a three-bit source data transfer request.

16. The electronic bridging device according to claim 15, wherein one or more of the data transfer requests comprises a three-bit destination data transfer request.

* * * * *